Dec. 8, 1942. H. B. AXTELL Re. 22,231

PHOTOGRAPHIC EXPOSURE METER

Original Filed March 22, 1937

INVENTOR.

BY Harold B. Axtell.

R. Ritzenberg

ATTORNEY.

Reissued Dec. 8, 1942

Re. 22,231

UNITED STATES PATENT OFFICE 22,231

PHOTOGRAPHIC EXPOSURE METER

Harold B. Axtell, Altadena, Calif., assignor of one-third to William R. Litzenberg, Los Angeles, Calif.

Original No. 2,172,634, dated September 12, 1939, Serial No. 132,342, March 22, 1937. Application for reissue August 30, 1941, Serial No. 408,919½

3 Claims. (Cl. 88—23)

My invention relates particularly to photographic exposure meters designed to ascertain and indicate the intensity of the light condition in connection with photography, whereby the correct exposure adjustments can be made in the camera.

Among the salient objects of my invention are: to provide in such a device a variable light which can be adjusted to accurately correspond with the light reflected into a camera from the scene or object being photographed, and interposing a voltmeter or other instrument in the circuit to such light, with means connected therewith for indicating the light intensity or condition; to provide in combination with a device of the character referred to, a color filter or tint sheet for the light reflected into the camera from the object or scene being photographed, and also for the variable light, whereby to facilitate the adjustment of the variable light and its accurate correspondence to the reflected light from the scene or object being photographed; to provide in a device of the character referred to a mirror for reflecting the light received, said mirror or other reflecting surface having a hole therethrough and having the variable light positioned to show its light through said hole to mingle with the reflected light rays to greatly facilitate the process of adjusting the variable light to the same intensity as the light received from the scene or object being photographed; to provide in connection with such reflector and its hole, between the variable light and said hole, means for diffusing the light from the variable light source, whereby to make it uniform and thus make it possible to more accurately harmonize the variable light and the light reflected into the apparatus from the object being photographed; and, in general, to provide an improved exposure meter which is compact, practical and economical, and with which it is possible to accurately determine the light condition or intensity, with suitable graduated or measuring means for registering the result either in light units or photographic exposure units.

In order to fully explain my invention, I have shown on the accompanying sheet of drawings one practical embodiment thereof, which I will now describe.

Figure 6:
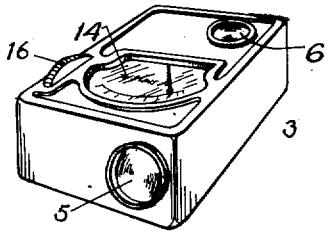
Figure 6 is a perspective view of a photometer embodying my invention.
Figure 1:
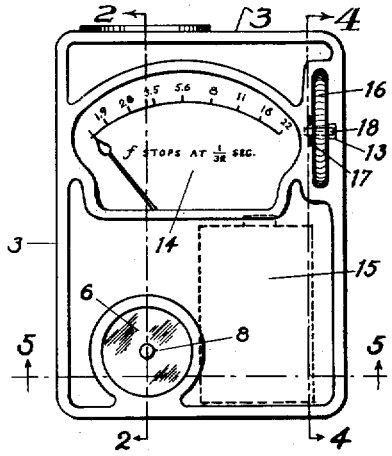
Figure 1 is a plan view of an instrument embodying my invention, showing the position of the battery.

Referring now in detail to the drawing, my invention as here embodied for descriptive purposes consists of a box or case 3, of suitable material, having a base or bottom 2, secured in place by screws 4, 4. A lens 5 is mounted in one end of the case, as shown, and an eyepiece or lens 6 is mounted in the top, as indicated. A mirror 7 is mounted therein, at an angle to receive light rays from the lens 5 and reflect or direct them to the eyepiece 6, as indicated by the light broken lines. The mirror 7 is silvered or "aluminized" on its surface, as at 24, preferably on its upper surface to eliminate double reflection from the surface of the glass when silvered on the bottom. Said mirror 7 is provided with a hole or aperture 8 in the reflecting surface, which may be referred to as the "spot." This may be of any desired or suitable size or shape, though it preferably will be somewhat elliptical in shape so as to present the appearance of a round hole when viewed at an angle of forty-five degrees to the mirror. It should preferably be small relative to the field being viewed.

Below the mirror 7, a lamp 9 is removably mounted in a suitable socket 22. A diffusing plate 11 is also mounted on the under side of the mirror and may be of ground glass or other translucent material. A color or tint filter or sheet 10 is mounted between the mirror and said disc 11, as indicated. This may be made of colored gelatine, preferably blue, or any other suitable means for unifying the light rays passing therethrough. A similar color-giving means is shown in connection with the lens 5, and is designated 12.

Figure 2:
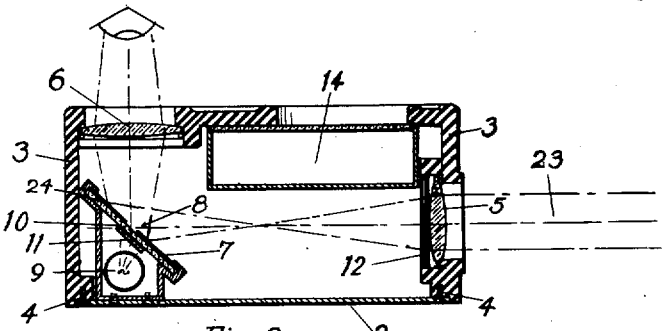
Figure 2 is a longitudinal sectional view therethrough on line 2—2 of Fig. 1.
Figure 7:
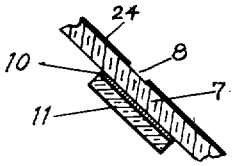
Figure 7 is a fragmentary view, enlarged, showing the light receiving mirror with the color and diffusing means in place thereon.

Light rays, as 23, from the scene or object being photographed, are picked up by the lens 5, and are reflected by the mirror 7 through the eyepiece 6 to the eye, as indicated by the broken lines. Light from the lamp 9, diffused by the member 11, and tinted by the member 10, passes through the aperture 8 through the mirror 7, and is mingled with the light rays 23 passing to the eyepiece lens 6, as will be understood from the showing made in Fig. 2. The light through the lens 5, and the light from the lamp 9, will be harmonized in color or tint and thus comparison is made easy.

Figure 3:
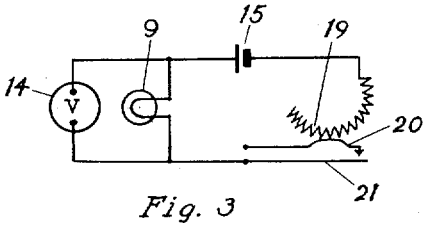
Figure 3 is a diagrammatic representation of the electric circuits.
Figure 4:
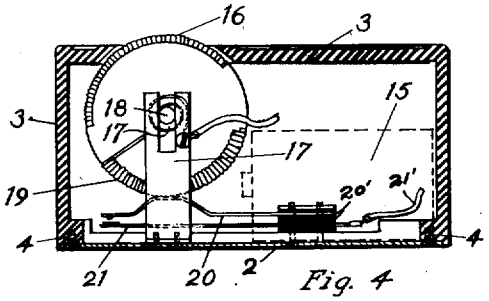
Figure 4 is a longitudinal sectional view through Fig. 1 on line 4—4.
Figure 5:
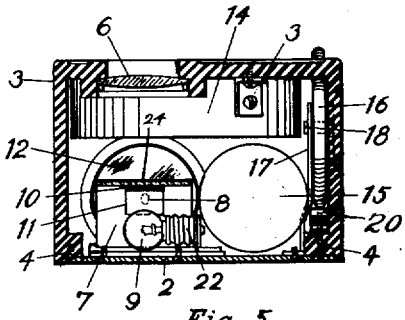
Figure 5 is a transverse sectional view taken on line 5—5 of Fig. 1.

In Fig. 4 I have shown a convenient type of rheostat consisting of a disc 16, of any suitable material with resistance winding 19 thereon. A shaft 18 supports the disc 16 in a slotted support, as at 17, whereby it can be moved up and down. Said disc 16 is shown supported upon a spring contact member 20, cooperating with a contact member 21, both of said members being anchored in insulating means 20', and connected with circuit wires, as 21', which include the lamp 9, as will be understood from the diagrammatic view in Fig. 3. A battery 15 is shown to furnish the current through said circuit. As said disc 16 is rotated by the thumb, the resistance winding 19 is varied relative to the contact member 20. The depressing of the disc 16 with the thumb, as it is rotated, also moves contact member 20 into engagement with member 21, as will be understood from Fig. 4. This constitutes means for varying the current applied to the lamp 9.

Thus I have provided a variable light which can be varied to correspond in intensity to the light rays 23 coming in from the scene or object being photographed. The spring of the member 20 is sufficient to raise said disc 16 and break the contact between members 20 and 21 when the thumb is removed therefrom. This breaks the circuit to the lamp 9.

In Fig. 3, I have illustrated a voltmeter 14 interposed in the circuit to the lamp 9. This indicates variations in voltage to the lamp, under the control of the rheostat 16. The voltage is proportional to the current flowing in the lamp and consequently to the luminosity of the lamp. The voltmeter may be calibrated in light values or in terms of photographic exposure values. An ammeter, in series with the battery, lamp and rheostat, can also be used if desired, as will be understood by those versed in the art. In either case, a suppressed zero instrument is preferable so that the needle will not leave the zero point until that voltage is reached at which the lamp just begins to give off light (above 0.8 volt for a 1.5 volt lamp). This extends the instrument range and is more easily read.

The use and operation of the invention as described may be briefly described as follows:

The device is pointed in the general direction of the object or scene to be photographed and the object located in the eyepiece 6, in the same manner that a camera finder is used. The meter is moved until the opening or "spot" 8 coincides with the particular object desired to photograph. The rheostat disc 16 is then depressed by the thumb of the right hand, and rotated until the "spot" 8 "disappears" or until it most nearly matches or corresponds in intensity of illumination of the light from the object being photographed. When this condition is found, and before releasing the rheostat disc 16, the meter reading is observed. Suitable calculating tables may be provided for determining combinations of shutter speed, diaphragm aperture, emulsion speeds, etc. from this reading. For most motion picture work, for which the particular embodiment shown is designed, the meter may be direct reading.

Since the luminosity of the lamp is proportional to the current flowing in it, which is in turn proportional to the voltage impressed across it, the reading is entirely independent of current supply or battery voltage. The battery may be used as long as it will light the lamp.

While I have shown and described somewhat in detail one practical embodiment of my invention, I am aware that many changes in details of construction and arrangement can be made therein without departing from the spirit of the invention, and I do not, therefore, limit the invention to the showing made for explanatory purposes, except as I may be limited by the hereto appended claims.

I claim:

1. A photographic exposure meter including a housing having a lens to receive light rays from the outside and an eyepiece to receive them therefrom, an angularly disposed reflecting surface interposed in said housing to receive and reflect said light rays from said lens to said eyepiece, said reflecting surface having an opening therethrough, an electric lamp positioned to be seen through said opening, means for diffusing the light from said lamp to uniformity for comparative purposes, a variable resistance to vary the current in said electric lamp for producing an intensity corresponding to that of the light through said lens, means for giving the same color or tint to the light rays and said electric light to harmonize them more readily, and an electrical measuring instrument, connected to the electric lamp and calibrated to indicate the voltage on said lamp directly in terms of light values.

2. A photographic exposure meter including a housing having a lens to receive light rays from the outside and an eyepiece to receive them therefrom, an angularly disposed reflecting surface interposed in said housing to receive and reflect said light rays from said lens to said eyepiece, said reflecting surface having an opening therethrough, an electric lamp positioned to be seen through said opening, means for diffusing the light from said lamp to uniformity for comparative purposes, a variable resistance to vary the current in said electric lamp for producing an intensity corresponding to that of the light through said lens, means for giving the same color or tint to the light rays and said electric light to harmonize them more readily, and an electrical measuring instrument connected in the lamp circuit for indication of light values.

3. A photographic exposure meter including a housing having an opening with an eyepiece therefor providing a view thereinto, a second opening into said housing with lens for admitting a view of a scene to be photographed, and an angularly disposed reflecting surface in said housing, interposed between said openings to provide a reflected view in said reflecting surface of the entire scene admitted by said second opening, said reflecting surface having an opening therein corresponding in size to a relatively small object in said reflected scene, an electric lamp positioned under said reflecting surface to provide light to be seen through said small opening to form a "spot" of light to be registered with said relatively small object in said reflected scene on said surface by directional positioning of said exposure meter, means for changing the intensity of the light emanating from said lamp to make possible the matching of the light intensity of said "spot" with the light intensity of said relatively small object in said reflected scene, and means for indicating the degree of intensity of the light emanating from said lamp.

HAROLD B. AXTELL.